(12) United States Patent
Wang et al.

(10) Patent No.: US 11,336,135 B2
(45) Date of Patent: May 17, 2022

(54) MOTOR ROTOR STRUCTURE AND PERMANENT MAGNET MOTOR

(71) Applicant: GREE ELECTRIC APPLIANCES, INC. OF ZHUHAI, Zhuhai (CN)

(72) Inventors: Min Wang, Zhuhai (CN); Yong Xiao, Zhuhai (CN); Quanfeng Li, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/236,120

(22) Filed: Apr. 21, 2021

(65) Prior Publication Data

US 2021/0242736 A1 Aug. 5, 2021

Related U.S. Application Data

(63) Continuation of application No. PCT/CN2019/103979, filed on Sep. 2, 2019.

(30) Foreign Application Priority Data

Nov. 14, 2018 (CN) .......................... 201811351661.3

(51) Int. Cl.
*H02K 1/2753* (2022.01)
*H02K 1/26* (2006.01)
(Continued)

(52) U.S. Cl.
CPC ............. *H02K 1/2753* (2013.01); *H02K 1/26* (2013.01); *H02K 21/10* (2013.01); *H02K 1/27* (2013.01); *H02K 2213/03* (2013.01)

(58) Field of Classification Search
CPC .......... H02K 1/26; H02K 1/27; H02K 1/2753; H02K 21/10; H02K 2213/03
See application file for complete search history.

(56) References Cited

U.S. PATENT DOCUMENTS

| 2007/0152527 A1* | 7/2007 | Yura | ....................... H02K 1/246 |
| | | | 310/156.53 |
| 2010/0060223 A1* | 3/2010 | Sakai | ....................... H02P 21/06 |
| | | | 318/494 |

(Continued)

FOREIGN PATENT DOCUMENTS

| CN | 101232205 A | 7/2008 |
| CN | 202231589 U | 5/2012 |

(Continued)

OTHER PUBLICATIONS

Zheng et al., English Machine Translation of CN 106208450 (Year: 2016).*

(Continued)

*Primary Examiner* — Rashad H Johnson
(74) *Attorney, Agent, or Firm* — Westbridge IP LLC

(57) ABSTRACT

Disclosed is a motor rotor structure including a rotor core. A plurality of radial slots each are in the rotor core along a circumferential direction, and a first flux barrier slot is provided between every two adjacent radial slots. Two kinds of permanent magnets having different coercivities mounted in each radial slot. The two kinds of permanent magnets having different coercivities are distributed along a radial direction of the rotor core. The two kinds of permanent magnets having different coercivities are both magnetized along a tangential direction of the rotor core. A second flux barrier slot is provided between the two kinds of permanent magnets having different coercivities.

20 Claims, 6 Drawing Sheets

(51) Int. Cl.
*H02K 21/10* (2006.01)
*H02K 1/27* (2022.01)

(56) References Cited

U.S. PATENT DOCUMENTS

| | | | | |
|---|---|---|---|---|
| 2010/0171385 A1* | 7/2010 | Sakai | ................... | H02K 1/2766 |
| | | | | 310/156.43 |
| 2018/0233971 A1* | 8/2018 | Kolehmainen | ........ | H02K 1/246 |
| 2019/0229568 A1* | 7/2019 | Toda | ....................... | H02K 19/24 |
| 2020/0014289 A1* | 1/2020 | Ko | ....................... | H02K 1/2773 |
| 2020/0328638 A1* | 10/2020 | Hu | ....................... | H02K 1/2766 |

FOREIGN PATENT DOCUMENTS

| | | | |
|---|---|---|---|
| CN | 102624181 | A | 8/2012 |
| CN | 106208450 | A | 12/2016 |
| CN | 109347229 | A | 2/2019 |
| CN | 209104916 | U | 7/2019 |
| JP | 5977155 | B2 | 8/2016 |

OTHER PUBLICATIONS

International Search Report issued in corresponding PCT Application No. PCT/CN2019/103979, dated Dec. 4, 2019.
Written Opinion issued in corresponding PCT Application No. PCT/CN2019/103979, dated Dec. 4, 2019.

* cited by examiner

MOTOR ROTOR STRUCTURE AND PERMANENT MAGNET MOTOR

CROSS-REFERENCE TO RELATED APPLICATIONS

This application is a continuation of International Application No. PCT/CN2019/103979, filed on Sep. 2, 2019, which claims priority to Chinese Patent Application No. 2018113516613, filed on Nov. 14, 2018. The disclosures of the aforementioned applications are hereby incorporated by reference in their entireties.

TECHNICAL FIELD

The present disclosure relates to the field of motor technologies, more particularly, to a motor rotor structure and a permanent magnet motor.

BACKGROUND

A magnetic-flux adjustable permanent magnet synchronous motor adjusts the intensity of an internal magnetic field of the motor according to a load of the motor. A permanent magnet motor in the related art provide magnetic flux by means of permanent magnets, but the magnetic field generated by the permanent magnets is fixed, so it is difficult to adjust an internal magnetic field of the motor, making it difficult for the permanent magnet motor to balance efficiency at a high frequency and efficiency at a low frequency. Moreover, in the case of a fixed power supply voltage, the maximum operating frequency of the motor is limited. At present, the operating ranges of most permanent magnet motors can be expanded only by means of a flux weakening control, but the flux weakening control causes problems of increasing motor copper loss, reducing motor efficiency, limiting a speed regulation range, and the like.

SUMMARY

Based on this, it is necessary to provide a motor rotor structure and a permanent magnet motor in view of the problems of increasing motor copper loss, reducing motor efficiency, limiting a speed regulation range, and the like when an operating range of a permanent magnet motor in the related art is expanded by means of a flux weakening control.

A motor rotor structure includes a rotor core. A plurality of radial slots each are in the rotor core along a circumferential direction, and a first flux barrier slot is provided between every two adjacent radial slots.

Two kinds of permanent magnets having different coercivities mounted in each radial slot. The two kinds of permanent magnets having different coercivities are distributed along a radial direction of the rotor core. The two kinds of permanent magnets having different coercivities are both magnetized along a tangential direction of the rotor core. A second flux barrier slot is provided between the two kinds of permanent magnets having different coercivities.

When magnetization directions of the two kinds of permanent magnets having different coercivities are opposite, the rotor core is in a more-magnetic-pole state, and when the magnetization directions of the two kinds of permanent magnets having different coercivities are identical, the rotor core is in a fewer-magnetic-pole state.

BRIEF DESCRIPTION OF DRAWINGS

In order to more clearly illustrate the technical solutions in embodiments of the present disclosure or in the related art, the accompanying drawings used in the description of the embodiments or the related art will be briefly introduced below. It is appreciated that, the accompanying drawings in the following description are only some embodiments of the present disclosure, and other drawings can be obtained by those of ordinary skill in the art from the provided drawings without creative work.

DETAILED DESCRIPTION OF THE EMBODIMENTS

The technical solutions in the embodiments of the present disclosure will be clearly and fully described below with reference to the drawings in the embodiments of the present disclosure. It is apparent that the embodiments described are merely a part of rather than all of the embodiments of the present disclosure. All other embodiments obtained by those of ordinary skill in the art based on the embodiments in the present disclosure without creative work fall within the protection scope of the present disclosure.

It should be noted that when one element is referred to as "attached to" another element, it may be directly disposed on the other element or an intermediate element may exist. When one element is considered to be "connected to" another element, it may be directly connected to the other element or an intermediate element may co-exist. Conversely, when an element is referred to as "directly" "on" another element, no intermediate element exists. The terms "vertical", "horizontal", "left", "right" and similar expressions used herein are for illustrative purposes only.

Figure 1:
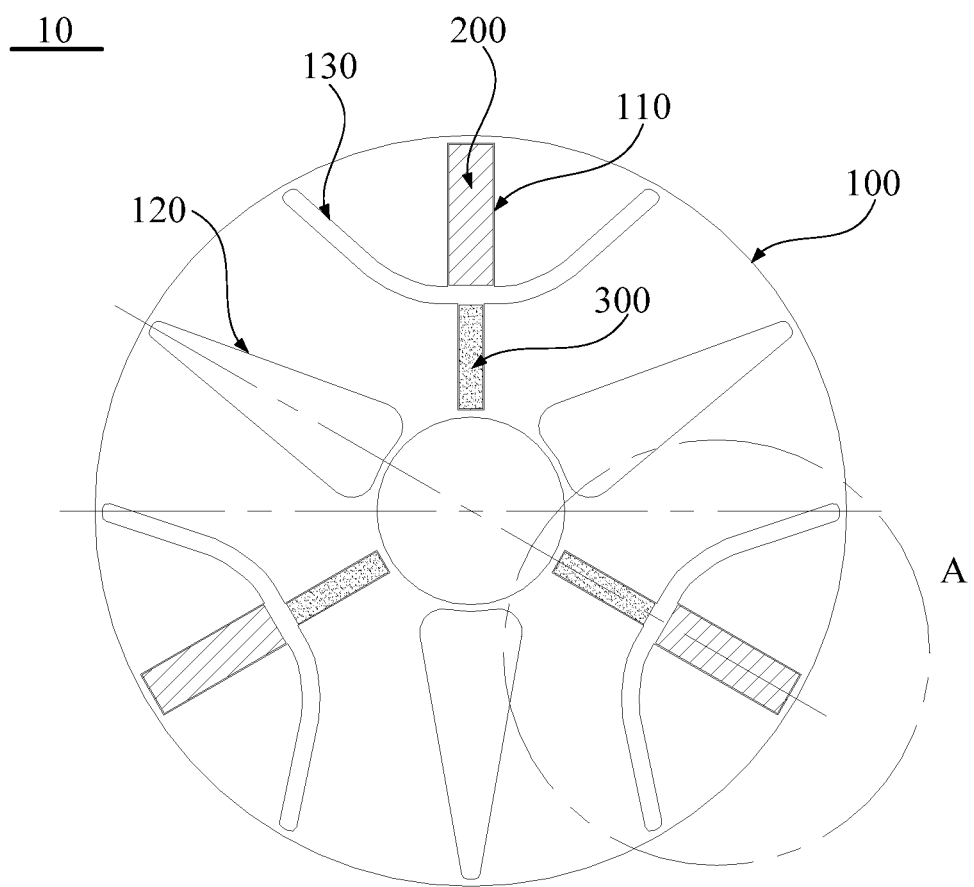
FIG. 1 is a schematic structural diagram illustrating a motor rotor structure according to an embodiment of the present disclosure.

Referring to FIG. 1, a motor rotor structure 10 according to an embodiment of the present disclosure includes a rotor core 100. A plurality of radial slots 110 each are disposed in the rotor core 100 along a circumferential direction, and a first flux barrier slot 120 is provided between every two adjacent radial slots 110. Two kinds of permanent magnets having different coercivities are mounted in each radial slot 110. The two kinds of permanent magnets having different coercivities are distributed along a radial direction of the rotor core 100, and the two kinds of permanent magnets having different coercivities are both magnetized along a tangential direction of the rotor core 100. A second flux barrier slot 130 is provided between the two kinds of permanent magnets having different coercivities. When the magnetization directions of the two kinds of permanent magnets having different coercivities are opposite, the rotor core 100 is in a more-magnetic-pole state, and when the magnetization directions of the two kinds of permanent magnets having different coercivities are identical, the rotor core 100 is in a fewer-magnetic-pole state.

It should be understood that the two kinds of permanent magnets having different coercivities includes one kind of permanent magnet with a relatively lower coercivity (e.g., a lower-coercivity permanent magnet 200 shown in FIG. 1) and the other kind of permanent magnet with a relatively higher coercivity (e.g., a higher-coercivity permanent magnet 300 shown in FIG. 1). Accordingly, when a magnetization direction of the lower-coercivity permanent magnet changes, the higher-coercivity permanent magnet does not change. Therefore, the number of magnetic poles of the rotor core 100 may be changed to adapt to an operating state of the motor and improve motor efficiency. The rotor core 100 being in a more-magnetic-pole state refers to the rotor core 100 that has more magnetic poles than the rotor core 100 being in the fewer-magnetic-pole state does. The more-magnetic-pole state of the rotor core 100 also corresponds to a state of the motor having more magnetic poles. The rotor core 100 being in a fewer-magnetic-pole state refers to the rotor core 100 that has fewer magnetic poles than the rotor core 100 being in the more-magnetic-pole state does. The fewer-magnetic-pole state of the rotor core 100 also corresponds to a state of the motor having fewer magnetic poles. The first flux barrier slot 120 is configured to separate magnetic fields generated by permanent magnets in two adjacent radial slots 110, so as to avoid flux leakage. The second flux barrier slot 130 is configured to separate magnetic fields generated by the two kinds of permanent magnets having different coercivities in each radial slot 110, so as to reduce or even eliminate influences of the permanent magnet having the relatively higher coercivity on the permanent magnet having the relatively lower coercivity during magnetization, thus reducing difficulty of changing, by an armature winding, a magnetization direction of the permanent magnet having the relatively lower coercivity, and reducing a magnetization current.

Two kinds of permanent magnets having different coercivities are provided, and the two kinds of permanent magnets having different coercivities are separated by the second flux barrier slot 130, so that an internal magnetic field of a motor rotor can be adjusted according to a requirement. When the motor operates at a low-speed and large-torque state, the motor changes a magnetization direction of the permanent magnet with the relatively lower coercivity in the rotor core 100 by means of an armature current, so that the rotor core 100 is in a more-magnetic-pole state. In this case, the number of magnetic poles of the motor is relatively large, and the torque generated is relatively large. When the motor operates at a high-speed and small-torque state, the motor changes the magnetization direction of the permanent magnet with the relatively lower coercivity in the rotor core 100 by means of an armature current, so that the rotor core 100 is adjusted to be in a fewer-magnetic-pole state. In this case, the number of magnetic poles of the motor is reduced, and the generated torque is relatively small, but at a same electrical frequency, the rotation speed increases. Therefore, the motor rotor structure 10 is able to adjust an internal magnetic field according to the operation condition of the motor, so that the rotor core 100 has a more-magnetic-pole state and a fewer-magnetic-pole state, thereby widening a high-efficiency region of the motor and expanding an operation range of the motor.

Figure 2:
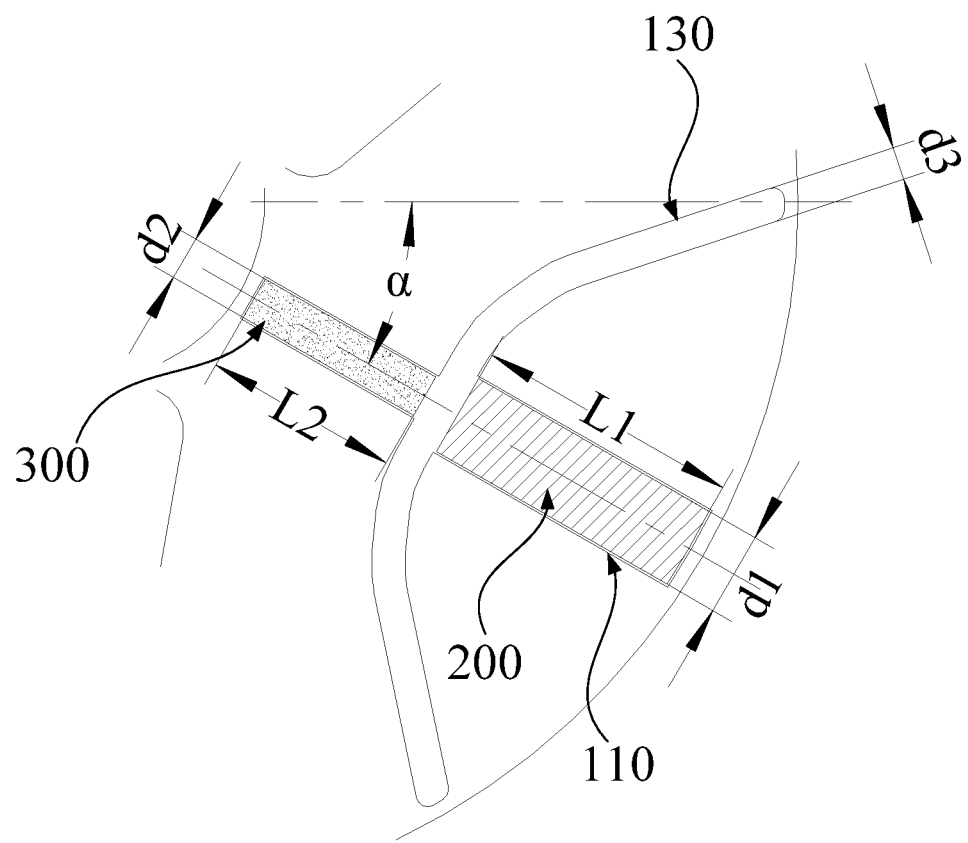
FIG. 2 is a partial enlarged view illustrating A in the structure shown in FIG. 1.

Referring to FIG. 1, as an implementable manner, two ends of the second flux barrier slot 130 in a width direction thereof are both proximate to an outer circle of the motor rotor structure. The two ends of the second flux barrier slot 130 extend towards the outer circle of the motor rotor structure, thus enabling flux leakage to be effectively reduced. In an embodiment, the second flux barrier slot 130 has a thickness ranging from 2g to 5g, wherein g denotes an air gap of the motor. Referring to FIG. 2, d3 denotes the thickness of the second flux barrier slot 130 i.e., $2g<d3<5g$. The effective flux isolation implemented by the flux barrier slot 130 can be guaranteed by reasonably configuring the thickness of the second flux barrier slot 130.

Referring to FIG. 1 through 2, in an embodiment, a central angle between a center of one end of the second flux barrier slot 130 proximate to the outer circle of the motor rotor structure and a center of an end of the radial slot 110 proximate to the outer circle of the motor rotor structure is $\alpha$, where $0.9 \times \pi/n < \alpha < 1.1 \times \pi/n$, and n denotes the number of magnetic poles of the rotor core 100 in the fewer-magnetic-pole state. By means of such a configuration, a pole-arc coefficient of each pole of the rotor core 100 in the fewer-magnetic-pole state can be guaranteed to be consistent.

Figure 3:
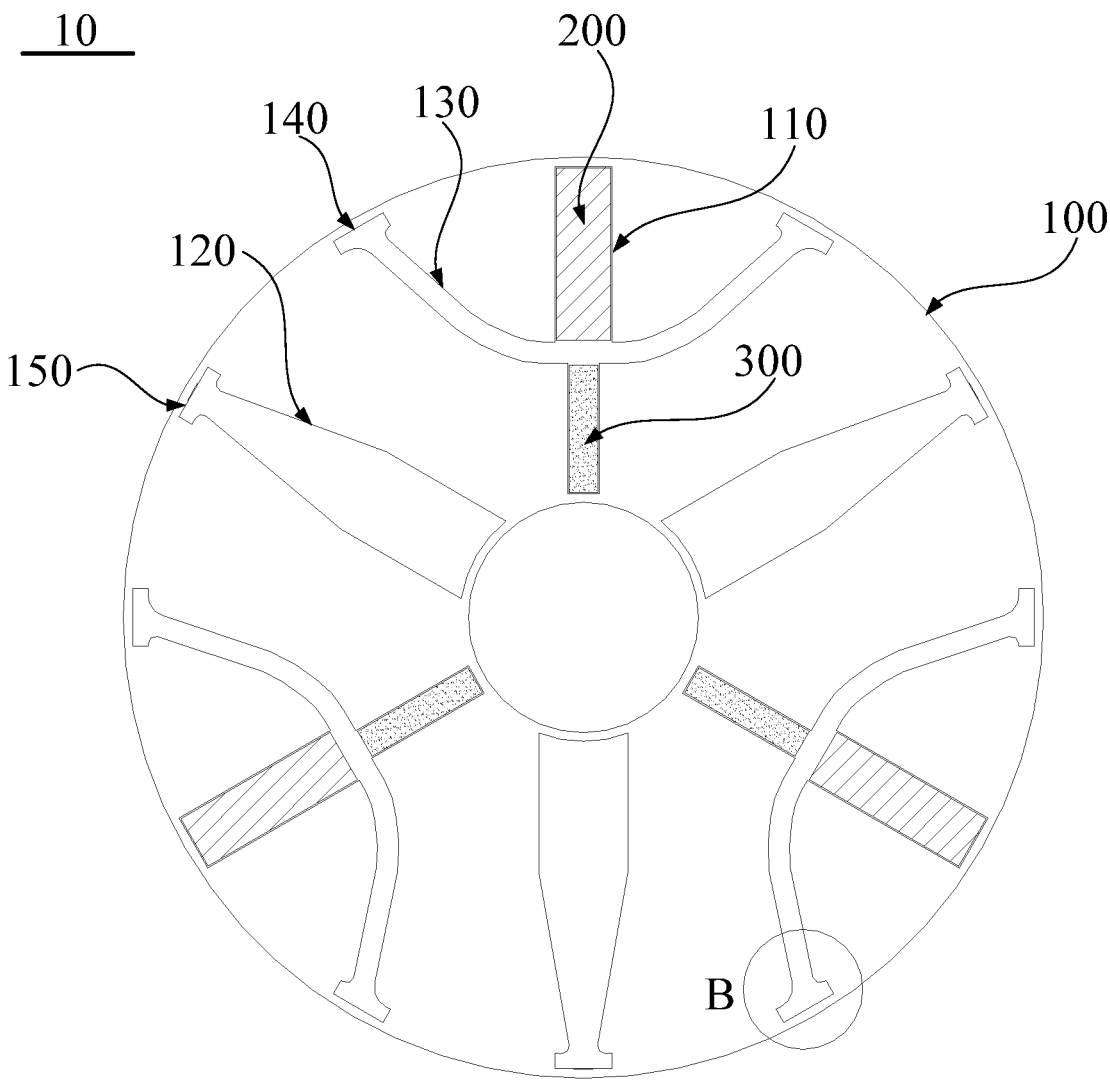
FIG. 3 is a schematic structural diagram illustrating the motor rotor structure according to another embodiment of the present disclosure.

Referring to FIG. 3, in an embodiment, the motor rotor structure 10 further includes third flux barrier slots 140 arranged on two ends of the second flux barrier slot 130 proximate to the outer circle of the motor rotor structure. A width direction of each of the third flux barrier slots 140 is parallel to a tangential direction of the rotor core 100 corresponding to a position where each of the third flux barrier slots 140 is located. The pole-arc coefficient of each pole of the rotor core 100 may be guaranteed to be consistent by providing the third flux barrier slots 140.

Figure 4:
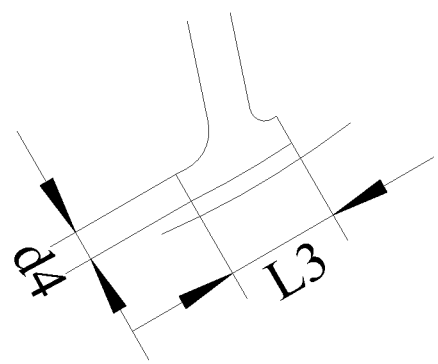
FIG. 4 is a partial enlarged view illustrating B in the structure shown in FIG. 3.

Some limitation may be made on dimensions of the third flux barrier slot 140. It should be understood that a length direction of the third flux barrier slot 140 is along a axial direction of the rotor core 100, and a length of the third flux barrier slot 140 is related to a length of the rotor core 100 along the axial direction. Generally, the length of the third flux barrier slot 140 is equal to the length of the rotor core 100 along the axial direction. The foregoing limitations on the dimensions of the third flux barrier slots 140 mainly restrict a width and a thickness thereof. Referring to FIG. 4, in an embodiment, the third flux barrier slot 140 has a thickness ranging from 2g to 5g, where g denotes the air gap of the motor. As shown in FIG. 4, d4 denotes the thickness of the third flux barrier slot 140, i.e., $2g<d4<5g$. Assuming that L3 denotes the width of the third flux barrier slot 140, and d denotes a thickness of one side of the radial slot 110 proximate to the outer circle of the motor rotor structure, then $0.8 \times d < L3 < 1.2 \times d$ is satisfied. By means of reasonable configuration of the dimensions of the third flux barrier slot 140, a reasonable structure of the rotor core 100 and a stable operation of the motor can be ensured.

It should be noted that the permanent magnet fits the radial slot 110 and is mounted therein. The thickness of the radial slot 110 may be presented by a thickness of the permanent magnet. As shown in FIG. 3, the permanent magnet proximate to one side of the outer circle of the motor rotor structure is the lower-coercivity permanent magnet 200. On a premise of a uniform thickness of the lower-coercivity permanent magnet 200, the thickness d of one side of the radial slot 110 proximate to the outer circle of the motor rotor structure is equal to the thickness (the dimension represented by d1 in FIG. 2) of the lower-coercivity permanent magnet 200. It should be understood that, assuming that permanent magnet proximate to the side of the outer circle of the motor rotor structure is the higher-coercivity permanent magnet 300, and on a premise of a uniform thickness of the higher-coercivity permanent magnet 300, the thickness d of one side of the radial slot 110 proximate to the outer circle of the motor rotor structure is equal to the thickness (the dimension represented by d2 in FIG. 2) of the higher-coercivity permanent magnet 300.

Referring to FIG. 1, as an implementable manner, two ends of the first flux barrier slot 120 along a radial direction of the rotor core 100 are proximate to an inner circle of a rotor and an outer circle of the motor rotor structure, respectively, and a thickness of one end of the first flux barrier slot 120 proximate to the inner circle of the motor rotor structure is greater than the thickness of another end of the first flux barrier slot proximate to the outer circle of the motor rotor structure. By means of such a configuration, effective flux isolation implemented by the first flux barrier slot 120 can be guaranteed.

Referring to FIG. 3, in an embodiment, the motor rotor structure 10 further includes a fourth flux barrier slot 150. The fourth flux barrier slot 150 is arranged at an end of the first flux barrier slot 120 proximate to the outer circle of the motor rotor structure, and a width direction of the fourth flux barrier slot 150 is parallel to a tangential direction of the rotor core 100 corresponding to a position where the fourth flux barrier slot 150 is located. The pole-arc coefficient of each pole of the rotor core 100 can be guaranteed to be consistent by providing the fourth flux barrier slot 150.

Some limitations may be made on dimensions of the fourth flux barrier slot 150. Referring to the description of the dimensions of the third flux barrier slot 140, the fourth flux barrier slot 150 may have a thickness ranging from 2g to 5g, where g denotes the air gap of the motor. Assuming that L4 denotes the width of the fourth flux barrier slots 150, and d denotes a thickness of the side of the radial slot 110 proximate to the outer circle of the motor rotor structure, then 0.8×d<L4<1.2×d is satisfied. By means of reasonable configuration of the dimensions of the fourth flux barrier slot 150, a reasonable structure of the rotor core 100 and the stable operation of the motor can be ensured.

The two kinds of permanent magnets having different coercivities may be arranged in each of the radial slots 110 in various manners. Referring to FIG. 1, as an implementable manner, the two kinds of permanent magnets having different coercivities are the lower-coercivity permanent magnet 200 and the higher-coercivity permanent magnet 300, respectively. The lower-coercivity permanent magnet 200 is arranged in one side of the radial slot 110 proximate to an outer circle of a rotor, and the higher-coercivity permanent magnet 300 is arranged in another side of the radial slot 110 proximate to an inner circle of the motor rotor structure. In some embodiments, only one set of lower-coercivity permanent magnets 200 and one set of higher-coercivity permanent magnets 300 are provided in a same radial slot 110. The set of lower-coercivity permanent magnets 200 may be an integral permanent magnet, or may include a plurality of permanent magnets distributed along the axial direction of the rotor core 100. The set of higher-coercivity permanent magnets 300 may also be an integral permanent magnet, or may include a plurality of permanent magnets distributed along the axial direction of the rotor core 100. The set of lower-coercivity permanent magnets 200 are arranged in one side of the radial slot 110 proximate to the outer circle of the motor rotor structure, and the set of higher-coercivity permanent magnets 300 are arranged in the other side of the radial slot 110 proximate to the inner circle of the motor rotor structure. The permanent magnet with the relatively lower coercivity is arranged in the side proximate to the outer circle of the motor rotor structure, so that the difficulty in magnetizing the permanent magnet with the relatively lower coercivity can be effectively reduced, thereby facilitating a change of the number of magnetic poles of the rotor core 100.

In other embodiments, the set of lower-coercivity permanent magnets 200 may also be arranged in the other side of the radial slot 110 proximate to the inner circle of the motor rotor structure, and the set of higher-coercivity permanent magnet 300 may also be arranged in the side of the radial slots 110 proximate to the outer circle of the motor rotor structure. Alternatively, not just one set of lower-coercivity permanent magnets 200 and not just one set of higher-coercivity permanent magnets 300 are provided. For example, two sets of lower-coercivity permanent magnets 200 and one set of higher-coercivity permanent magnets 300 are provided in the same radial slot 110. The two sets of lower-coercivity permanent magnets 200 and the one set of higher-coercivity permanent magnets 300 are arranged alternately in the radial slot 110 along the radial direction of the rotor core 100. Thus, the two sets of lower-coercivity permanent magnets 200 may form two pairs of magnetic poles, and the one set of higher-coercivity permanent magnets 300 may form one pair of magnetic poles, and compared with the structure provided with only one set of lower-coercivity permanent magnets 200 and one set of higher-coercivity permanent magnets 300 in the same radial slot 110, the rotor core 100 of this example has more magnetic poles available for change.

Figure 5:
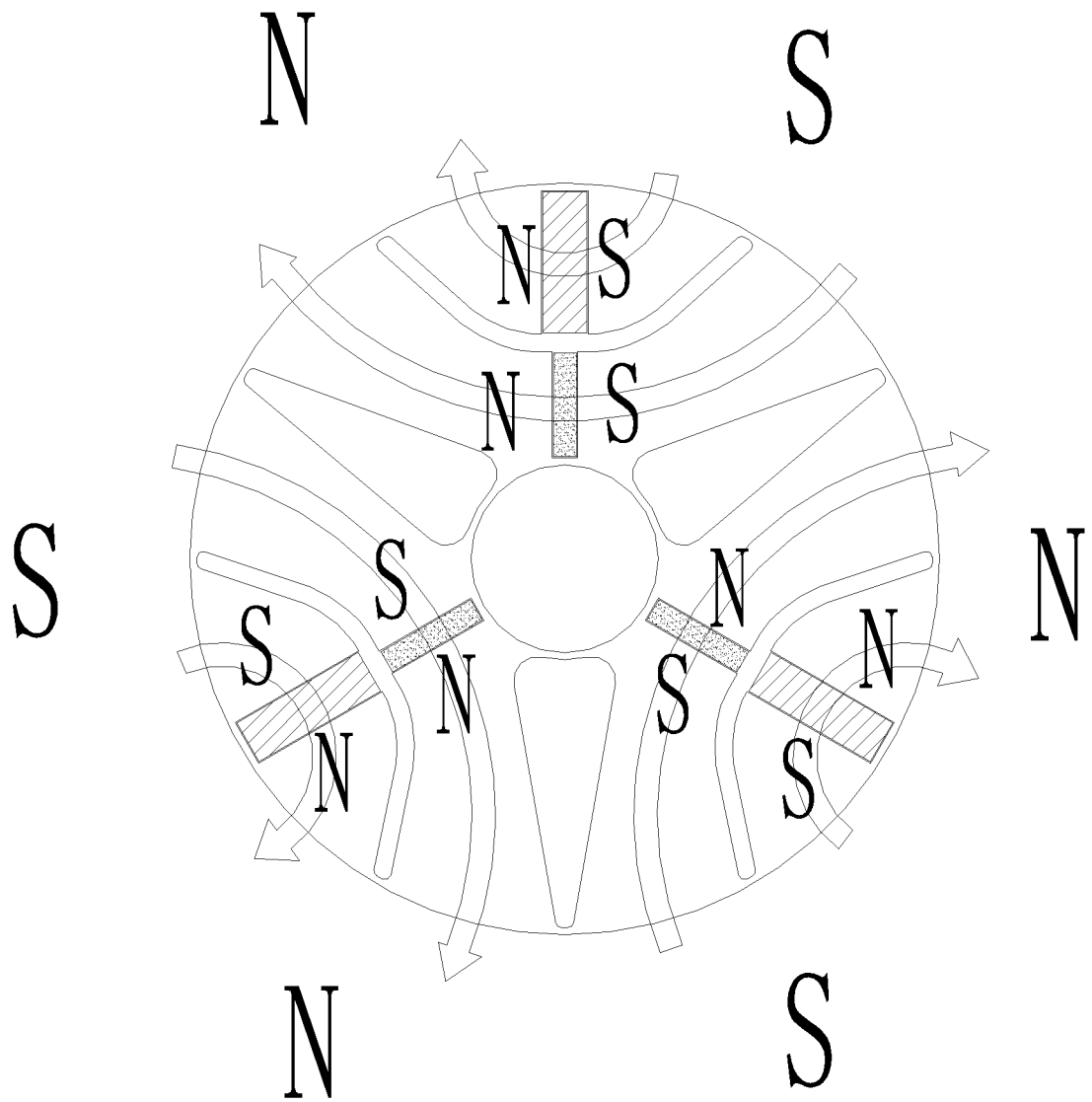
FIG. 5 is a diagram illustrating magnetic circuits in a rotor core of the structure shown in FIG. 1 when the rotor core is in a fewer-magnetic-pole state.
Figure 6:
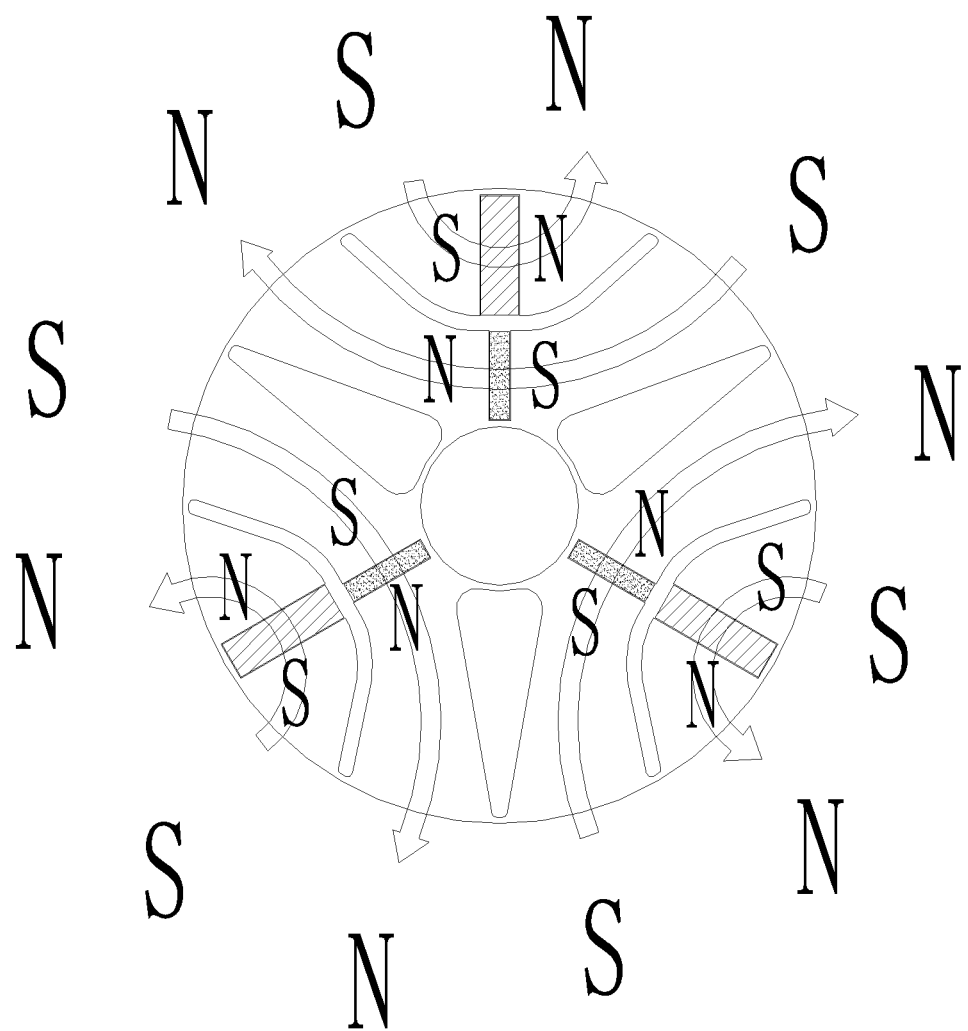
FIG. 6 is a diagram illustrating magnetic circuits in the rotor core of the structure shown in FIG. 1 when the rotor core is in a more-magnetic-pole state.

Referring to FIG. 5 and FIG. 6, FIG. 5 is diagram illustrating magnetic circuits when the rotor core 100 is in a fewer-magnetic-pole state. N and S at an inner side of the outer circle of the motor rotor structure in FIG. 5 illustrate a distribution of magnetic poles of each permanent magnet. N and S at an outer side of the outer circle of the motor rotor structure in FIG. 5 illustrate a distribution of magnetic poles of the rotor core 100 in a fewer-magnetic-pole state.

FIG. 6 is a diagram illustrating magnetic circuits when the rotor core 100 is in a more-magnetic-pole state. N and S at an inner side of the outer circle of the motor rotor structure in FIG. 6 illustrate a distribution of magnetic poles of each permanent magnet. N and S at an outer side of the outer circle of the motor rotor structure in FIG. 6 illustrate a distribution of magnetic poles of the rotor core 100 in a more-magnetic-pole state.

Referring to FIG. 5 and FIG. 6, as an implementable manner, when the rotor core 100 is in the fewer-magnetic-pole state, the number of magnetic poles of the rotor core 100 is n. When the rotor core 100 is in the more-magnetic-pole state, the number of magnetic poles of the rotor core 100 is 2n. Two kinds of permanent magnets having different coercivities are provided in the rotor core 100. The numbers of magnetic poles are formed by the two kinds of permanent magnets having different coercivities respectively are identical. In other words, in the rotor core 100, the number of sets of the higher-coercivity permanent magnets 300 is the same as the number of sets of the lower-coercivity permanent magnets 200, that is, the number of magnetic poles of the higher-coercivity permanent magnets 300 is the same as the number of magnetic poles of the lower-coercivity permanent magnets 200. Referring to FIG. 5, when magnetization directions of the two kinds of permanent magnets having different coercivities are identical, the rotor core 100 is in the fewer-magnetic-pole state, and the number of magnetic poles of the rotor core 100 is n. Referring to FIG. 6, when magnetization directions of the two kinds of permanent magnets having different coercivities are opposite, the rotor core 100 is in the more-magnetic-pole state, and the number of magnetic poles of the rotor core 100 is 2n. Such a configuration makes the structure of the rotor core 100 simpler, and makes it easier to arrange the permanent magnets.

Referring to FIG. 2, as an implementable manner, the two kinds of permanent magnets having different coercivities are the lower-coercivity permanent magnet 200 and the higher-coercivity permanent magnet 300, respectively. The lower-coercivity permanent magnet 200 has a coercivity H1 and a thickness d1, and the higher-coercivity permanent magnet 300 has a coercivity H2 and a thickness d2, then d2×H2/H1×0.9<d1<d2×H2/H1×1.1 is satisfied. If the thickness of the lower-coercivity permanent magnets 200 is too small, the anti-demagnetization capability of the low-coercivity permanent magnet 200 may be insufficient, thus resulting in uncontrollable demagnetization of the motor during operation. If the thickness of the lower-coercivity permanent magnets 200 is too large, the difficulty of magnetization may be increased in a process of adjusting the magnetic field, thus increasing the magnetization current and making it difficult to adjust the magnetic field of the motor. The thickness of the lower-coercivity permanent magnets 200 is configured in such a manner that the anti-demagnetization capabilities of the two kinds of permanent magnets having different coercivities are ensured to be substantially identical, thereby avoiding the problem of uncontrollable demagnetization of the motor during operation or the difficulty of adjusting the magnetic field of the motor.

Referring to FIG. 2, as an implementable manner, the two kinds of permanent magnets having different coercivities are the lower-coercivity permanent magnet 200 and the higher-coercivity permanent magnet 300, respectively. The lower-coercivity permanent magnet 200 has remanence Br1 and a width L1, and the higher-coercivity permanent magnet 300 has remanence Br2 and a width of L2, and L2×Br2/Br1×0.9<L1<L2×Br2/Br1×1.1 is satisfied. In such a structure, the magnetic flux of the two kinds of permanent magnets having different coercivities can be ensured to be substantially identical, and the torque ripple of the motor can be ensured to be not too large.

Figure 7:
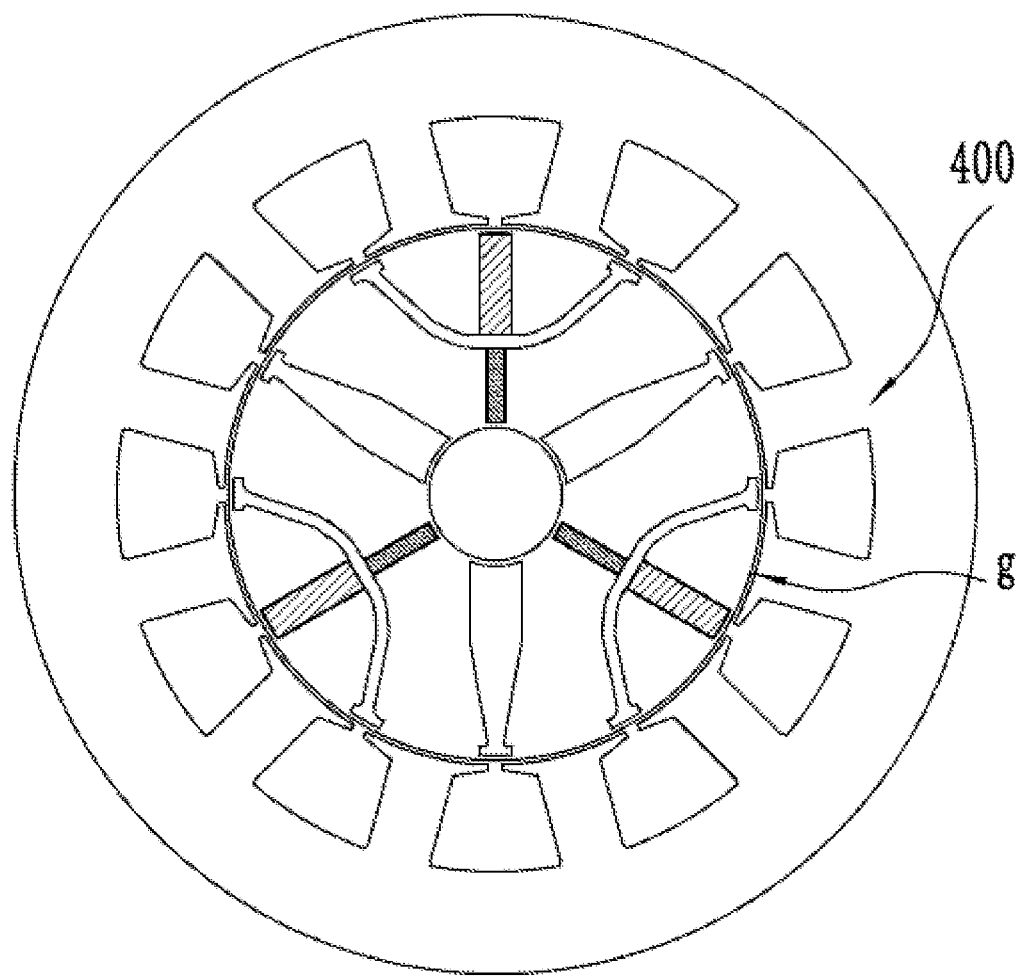
FIG. 7 is a schematic structural diagram illustrating a motor air gap and a stator core according to embodiments of the present disclosure.

Referring to FIG. 7, an embodiment of the present disclosure further provides a permanent magnet motor, including a stator core 400 and a motor rotor structure, wherein the motor rotor structure is the motor rotor structure 10 of any one of the solutions described above. Since the motor rotor structure 10 has the above beneficial effects, when the operation state of the permanent magnet motor changes, the magnetization direction of the permanent magnet with the relatively lower coercivity disposed in the rotor core 100 can be changed by means of an armature current, thereby achieving adjustment of the number of magnetic poles of the motor rotor, and achieving the purpose of expanding a speed regulation range.

The present disclosure has the following beneficial effects:

Two kinds of permanent magnets having different coercivities are provided, and the two kinds of permanent magnets having different coercivities are separated by the second flux barrier slot, so that an internal magnetic field of a motor rotor can be adjusted according to a requirement. When the motor operates at a low-speed and large-torque state, the motor changes a magnetization direction of the permanent magnet with the relatively lower coercivity in the rotor core by means of an armature current, so that the rotor core is in a more-magnetic-pole state. In this case, the number of magnetic poles of the motor is relatively large, and the torque generated is relatively large. When the motor operates at a high-speed and small-torque state, the motor changes the magnetization direction of the permanent magnet with the relatively lower coercivity in the rotor core by means of an armature current, so that the rotor core is adjusted to be in a fewer-magnetic-pole state. In this case, the number of magnetic poles of the motor is reduced, and the generated torque is relatively small, but at a same electrical frequency, the rotation speed increases. Therefore, the motor rotor structure is able to adjust an internal magnetic field according to the operation condition of the motor, so that the rotor core has a more-magnetic-pole state and a fewer-magnetic-pole state, thereby increasing a high-efficiency region of the motor and expanding an operation range of the motor. By means of the second flux barrier slot, influences of the permanent magnet having the relatively higher coercivity on the permanent magnet having the relatively lower coercivity during magnetization can be reduced or even eliminated, thus reducing difficulty of changing, by an armature winding, a magnetization direction of the permanent magnet having the relatively lower coercivity, and reducing a magnetization current.

The technical features of the above embodiments may be arbitrarily combined. For the sake of brevity, all possible combinations of the technical features in the above embodiments are not described. However, if there is no contradiction in the combinations of the technical features, the combinations shall be considered to be within the scope of the specification.

The above embodiments represent only several implementations of the present disclosure, which are described more specifically and in detail, but are not to be construed as limiting the scope of the present disclosure. It should be noted that, for those of ordinary skill in the art, a number of transformations and improvements can also be made without departing from the conception of the present disclosure, and all these transformations and improvements fall within the protection scope of the present disclosure. Therefore, the protection scope of the present disclosure shall be subject to the appended claims.

What is claimed is:

1. A permanent magnet motor rotor structure, comprising a rotor core, wherein:
   a plurality of radial slots are provided in the rotor core along a circumferential direction, and a first flux barrier slot is provided between every two adjacent radial slots;
   two kinds of permanent magnets having different coercivities are mounted in each radial slot of the plurality of radial slots; the two kinds of permanent magnets having different coercivities are distributed along a radial direction of the rotor core; the two kinds of permanent magnets having different coercivities are both magnetized along a tangential direction of the rotor core; a second flux barrier slot is provided between the two kinds of permanent magnets having different coercivities, the second flux barrier slot is configured to separate the two kinds of permanent magnets having different coercivities and separate the magnetic fields generated by the two kinds of permanent magnets; and
   when magnetization directions of the two kinds of permanent magnets having different coercivities are opposite, the rotor core is in a more-magnetic-pole state, and when the magnetization directions of the two kinds of permanent magnets having different coercivities are identical, the rotor core is in a fewer-magnetic-pole state.

2. The permanent magnet motor rotor structure according to claim 1, wherein the two kinds of permanent magnets having different coercivities comprise a lower-coercivity permanent magnet and a higher-coercivity permanent magnet; the lower-coercivity permanent magnet is arranged in one side of the radial slots proximate to an outer circle of the motor rotor structure; and the higher-coercivity permanent magnet is arranged in another side of the radial slot proximate to an inner circle of the motor rotor structure.

3. The permanent magnet motor rotor structure according to claim 1, wherein when the rotor core is in the fewer-magnetic-pole state, a number of magnetic poles of the rotor core is n, and when the rotor core is in the more-magnetic-pole state, a number of magnetic poles of the rotor core is 2n.

4. The permanent magnet motor rotor structure according to claim 1, wherein the two kinds of permanent magnets having different coercivities comprise a lower-coercivity permanent magnet and a higher-coercivity permanent magnet; the lower-coercivity permanent magnet has a coercivity H1 and a thickness d1, and the higher-coercivity permanent magnet has a coercivity H2 and a thickness d2; and $d2 \times H2/H1 \times 0.9 < d1 < d2 \times H2/H1 \times 1.1$ is satisfied.

5. The permanent magnet motor rotor structure according to claim 1, wherein the two kinds of permanent magnets having different coercivities comprise a lower-coercivity permanent magnet and a higher-coercivity permanent magnet; the lower-coercivity permanent magnet has remanence Br1 and a width L1, and the higher-coercivity permanent magnet has remanence Br2 and a width L2; and $L2 \times Br2/Br1 \times 0.9 < L1 < L2 \times Br2/Br1 \times 1.1$ is satisfied.

6. The permanent magnet motor rotor structure according to claim 1, wherein two ends of the second flux barrier slot in a width direction of the second flux barrier slot are both proximate to an outer circle of the motor rotor structure.

7. The permanent magnet motor rotor structure according to claim 6, further comprising third flux barrier slots arranged on two ends of the second flux barrier slot proximate to the outer circle of the motor rotor structure; and a width direction of each of the third flux barrier slots is parallel to a tangential direction of the rotor core corresponding to a position where each of the third flux barrier slots is located.

8. The permanent magnet motor rotor structure according to claim 7, wherein each of the third flux barrier slots have a thickness ranging from 2g to 5g, and g denotes a motor air gap.

9. The permanent magnet motor rotor structure according to claim 7, wherein d denotes a thickness of one side of the radial slot proximate to the outer circle of the motor rotor structure, and L3 denotes a width of each of the third flux barrier slots; and $0.8 \times d < L4 < 1.2 \times d$ is satisfied.

10. The permanent magnet motor rotor structure according to claim 1, wherein the second flux barrier slot has a thickness ranging from 2g to 5g, and g denotes a motor air gap.

11. The permanent magnet motor rotor structure according to claim 1, wherein a central angle between a center of one end of the second flux barrier slot proximate to an outer circle of the motor rotor structure and a center of one end of the radial slot proximate to the outer circle of the motor rotor structure is α, $0.9 \times \pi/n < \alpha < 1.1 \times \pi/n$ is satisfied, and n denotes a number of magnetic poles of the rotor core in the fewer-magnetic-pole state.

12. The permanent magnet motor rotor structure according to claim 1, wherein two ends of the first flux barrier slot along a radial direction of the rotor core are proximate to an inner circle of the motor rotor structure and an outer circle of the rotor, respectively, and a thickness of one end of the first flux barrier slot proximate to the inner circle of the rotor is greater than a thickness of another end of the first flux barrier slot proximate to the outer circle of the motor rotor structure.

13. The permanent magnet motor rotor structure according to claim 12, further comprising a fourth flux barrier slot arranged on the other end of the first flux barrier slot proximate to the outer circle of the motor rotor structure, and a width direction of the fourth flux barrier slot is parallel to a tangential direction of the rotor core corresponding to a position where the fourth flux barrier slot is located.

14. A permanent magnet motor, comprising a stator core and a motor rotor structure, wherein:
the motor rotor structure further comprises a rotor core;
a plurality of radial slots are provided in the rotor core along a circumferential direction, and a first flux barrier slot is provided between every two adjacent radial slots;
two kinds of permanent magnets having different coercivities are mounted in each radial slot of the plurality of radial slots; the two kinds of permanent magnets having different coercivities are distributed along a radial direction of the rotor core; the two kinds of permanent magnets having different coercivities are both magnetized along a tangential direction of the rotor core; a second flux barrier slot is provided between the two kinds of permanent magnets having different coercivities, the second flux barrier slot is configured to separate the two kinds of permanent magnets having different coercivities and separate the magnetic fields generated by the two kinds of permanent magnet; and
when magnetization directions of the two kinds of permanent magnets having different coercivities are opposite, the rotor core is in a more-magnetic-pole state, and when the magnetization directions of the two kinds of permanent magnets having different coercivities are identical, the rotor core is in a fewer-magnetic-pole state.

15. The permanent magnet motor according to claim 14, wherein the two kinds of permanent magnets having different coercivities comprise a lower-coercivity permanent magnet and a higher-coercivity permanent magnet; the lower-coercivity permanent magnet is arranged in one side of the radial slots proximate to an outer circle of the motor rotor structure; and the higher-coercivity permanent magnet is arranged in another side of the radial slot proximate to an inner circle of the motor rotor structure.

16. The permanent magnet motor according to claim 14, wherein when the rotor core is in the fewer-magnetic-pole state, a number of magnetic poles of the rotor core is n, and when the rotor core is in the more-magnetic-pole state, a number of magnetic poles of the rotor core is 2n.

17. The permanent magnet motor according to claim 14, wherein the two kinds of permanent magnets having different coercivities comprise a lower-coercivity permanent magnet and a higher-coercivity permanent magnet; the lower-coercivity permanent magnet has a coercivity H1 and a thickness d1, and the higher-coercivity permanent magnet has a coercivity H2 and a thickness d2; and $d2 \times H2/H1 \times 0.9 < d1 < d2 \times H2/H1 \times 1.1$ is satisfied.

18. The permanent magnet motor according to claim 14, wherein the two kinds of permanent magnets having different coercivities comprise a lower-coercivity permanent magnet and a higher-coercivity permanent magnet; the lower-coercivity permanent magnet has remanence Br1 and a width L1, and the higher-coercivity permanent magnet has remanence Br2 and a width L2; and $L2 \times Br2/Br1 \times 0.9 < L1 < L2 \times Br2/Br1 \times 1.1$ is satisfied.

19. The permanent magnet motor according to claim 14, wherein two ends of the second flux barrier slot in a width direction of the second flux barrier slot are both proximate to an outer circle of the motor rotor structure.

20. The permanent magnet motor according to claim 19, further comprising third flux barrier slots arranged on two ends of the second flux barrier slot proximate to the outer circle of the motor rotor structure; and a width direction of each of the third flux barrier slots is parallel to a tangential direction of the rotor core corresponding to a position where each of the third flux barrier slots is located.

* * * * *